United States Patent [19]

Kinzenbaw

[11] Patent Number: 4,648,334
[45] Date of Patent: Mar. 10, 1987

[54] AGRICULTURAL ROW CROP PLANTER WITH REAR-DRIVEN ROW UNITS

[75] Inventor: Jon E. Kinzenbaw, Williamsburg, Iowa

[73] Assignee: Kinze Manufacturing, Inc., Williamsburg, Iowa

[21] Appl. No.: 736,411

[22] Filed: May 20, 1985

Related U.S. Application Data

[63] Continuation of Ser. No. 534,541, Sep. 22, 1983, abandoned.

[51] Int. Cl.⁴ .................... A01C 5/00; A01B 63/00
[52] U.S. Cl. .................................... 111/52; 172/776
[58] Field of Search ............ 111/6, 7, 69, 14, 15, 111/67, 52, 53, 59–62, 63, 65, 66, 70, 71, 79, 80, 82, 85, 55; 172/834, 166, 413, 810, 307, 308, 689, 776

[56] References Cited

U.S. PATENT DOCUMENTS

| | | | |
|---|---|---|---|
| 756,907 | 4/1904 | Strathmann | 111/70 |
| 1,272,550 | 7/1918 | Smith | 111/82 X |
| 2,090,525 | 8/1937 | Carrier et al. | 111/70 |
| 2,518,822 | 8/1950 | Scott | 111/85 X |
| 3,031,984 | 5/1962 | Esmay | 111/82 |
| 3,042,118 | 7/1962 | Norris | 111/85 X |
| 3,336,885 | 8/1967 | Lebow | 111/85 |
| 3,643,745 | 2/1972 | Betalius et al. | 172/689 X |
| 3,774,557 | 11/1973 | Esmay | 111/82 |
| 3,924,694 | 12/1975 | Baughman et al. | 172/776 X |
| 4,009,668 | 3/1977 | Brass et al. | 111/85 |
| 4,266,489 | 5/1981 | Parramou | 111/52 X |
| 4,377,979 | 3/1983 | Peterson et al. | 111/52 |
| 4,425,857 | 1/1984 | Lienemann et al. | 111/52 X |

FOREIGN PATENT DOCUMENTS

| | | | |
|---|---|---|---|
| 2528930 | 1/1977 | Fed. Rep. of Germany | 111/85 |
| 3105656 | 9/1982 | Fed. Rep. of Germany | 111/52 |
| 1022236 | 3/1966 | United Kingdom | 111/85 |

OTHER PUBLICATIONS

White Farm Equipment Company, "Seedboss Planter", equipment advertisement brochure.
(Anon.) "Get the Productivity of Solid Seeding with the Advantages of Row-Cropping", advertising leaflet from White Farm Equipment, 2625 Butterfield Road Oak Brook, Illinois 60521, Jan. 18, 1982.

*Primary Examiner*—Richard J. Johnson
*Assistant Examiner*—Danton DeMille
*Attorney, Agent, or Firm*—Emrich & Dithmar

[57] ABSTRACT

An agricultural row crop planter is disclosed which includes a frame and a plurality of individual row units mounted to the frame. Some of the row units are mounted in front of the frame to be driven or pushed by it. The remaining units are mounted behind the frame and are pulled by it. Driven and pulled row units are arranged to plant alternate crop rows so the "on center" lateral spacing of row units is much greater than if all units were mounted side-by-side as is conventional. The driven row units are foreshortened and have their frames strengthened to withstand the forces encountered in use, particularly on curves. The arrangement enables the farmer to plant more than one crop with the same planter and without adjusting the spacing of row units. It also permits the manufacturer to provide a wide range of row spacing, including a very narrow one, with the same planter frame and row units while providing greater trash clearance.

4 Claims, 2 Drawing Figures

AGRICULTURAL ROW CROP PLANTER WITH REAR-DRIVEN ROW UNITS

This is a continuation of application Ser. No. 534,541, filed Sept. 22, 1983 now abandoned.

BACKGROUND OF THE INVENTION

The present invention relates to agricultural planters; and more particularly, it relates to planters for row crops. The two most important row crops in the United States are, of course, corn and soybeans in that order.

In an effort to increase crop yield, studies are continuously being made to determine the ideal spacing of crops—both the spacing of individual seeds in a row, and the spacing of adjacent rows. The present invention is directed primarily to problems associated with the spacing between adjacent rows as distinguished from intra-row spacing of individual plants.

By way of example, it was once popular to space rows of corn at 36 inches. Row spacing for hybrid corn now has generally been accepted to be best at about 30 inches. Soybeans, on the other hand, have a narrower row spacing. Current practice indicates a row spacing for beans of 15 inches, but this is determined to some extent by a desire to have the row spacing of corn a multiple of the row spacing for beans so that the same equipment can be set up and used for cultivating and harvesting.

Thus, from the standpoint of a manufacturer of agricultural planters, flexibility in permitting various row spacings is a very important consideration. Further, many farmers, particularly in the Corn Belt States of the United States plant both corn and beans. Some of these farmers, because of the short time normally available for good planting conditions, set up and use different planters for corn and for beans.

Another problem encountered by planter manufacturers is that their equipment will be used under different conditions of trash and seed bed preparation due to the various techniques employed by different farmers or in different regions for preparing the soil for planting. These techniques range from the conventional technique of moldboard plowing in the fall and additional tillage and seed bed preparation in the spring, to so-called "no-till" or minimum tillage planting in which a crop is planted on untilled soil or soil which is only slightly tilled. Problems arise in the no-till and minimum tillage practices because the planter must be capable of operating in conditions of high residue or "trash" as it is sometimes referred to. In other words, the planter must be capable of clearing trash and avoiding the accumulation trash during operation. This is a particularly accute problem for very narrow row spacings; and it has limited the use of popular row units employing double disk openers and adjacent gauge wheels on conventional planter frames for narrow row spacings because when the units are placed side-by-side on the same mounting bar, the gauge wheels of adjacent row units are so close together that they cannot adequately and reliably clear the trash in some instances. Thus, a second major problem with which a planter manufacturer must contend is the ability of the planter as a whole to operate satisfactorily and clear trash under the widely varying tillage and seed bed preparation practices employed and the current desire to achieve very narrow row spacings, such as for small seed crops where the desired row spacing is 7½ to 10 inches.

SUMMARY OF THE INVENTION

The present invention provides an agricultural row crop planter in which some or all of the row units are mounted to the frame and extend in front of the frame. As used herein, the "front" of the implement is the direction in which it is pulled, and the left and right sides of the implement are taken as the left and right sides of the operator sitting in the tractor. Further, the term "planter" refers to the overall implement including frame, mounting bars and individual row crop planting units, or simply "row units" as they are commonly called.

In the illustrated embodiment, alternate ones of the row units are mounted in front of the frame to be driven or pushed by the frame as it is pulled by the tractor; and intermediate units are mounted to the rear of the frame in conventional fashion to be pulled by the frame. The driven units are foreshortened. That is, whereas there is a provision for a seed hopper, there is no provision in the driven or pushed units for an insecticide/herbicide hopper. This reduces the stress exerted on the unit in use, particularly as it is pushed around curves or in other non-straight-line paths.

Further, the driven units have their frames strengthened to withstand the torque and lateral stresses encountered in use.

The arrangement of row units on a common frame enables the farmer to achieve a wide range of row spacing, including a very narrow row spacing, theoretically as narrow as 7½ in. Further, the same planter can easily be used and without modification to plant both corn and beans, simply by raising the driven or forward row units to a nonuse position and planting only with the rear units.

Further, by alternating row units, one being pulled at the rear of the frame and the row unit for the adjacent row being driven or pushed by the front of the frame, very narrow row spacings, heretofore impossible of attainment, can be achieved with conventional or popular row units, much desired by the farmer, and while providing greater trash clearance. In other words, whereas the spacing of adjacent crop rows planted by the implement is very narrow, the spacing of adjacent row units is twice that of the planted crop row spacing since the units are alternated front and rear.

Another advantage of placing row units on the front of a planter frame is that the implement is more stable in the transport position. If all of the row units are mounted to the rear of the planter frame, when the frame is raised to the transport position, the weight of the row units will have the effect of taking weight off the tractor hitch, if the support wheels are located in front of the row units. By mounting at least some, if not all, of the row units in front of the planter frame, the weight of the forward row units is placed on the hitch, thereby rendering the overall implement safer for road transport.

Still another advantage of placing row units in front of the planter frame is the greater visibility afforded to the operator during planting. That is, the farmer can observe whether trash is being cleared adequately, whether clods have lodged in the disk openers, and so on, far better when the units are located in front of the planter frame and being driven rather than when they are pulled behind the planter frame.

Other features and advantages will be apparent to persons skilled in the art from the following detailed description of one embodiment of the invention, accompanied by the attached drawing wherein identical reference numerals will refer to like elements in the various views.

DETAILED DESCRIPTION OF A PREFERRED EMBODIMENT

Figure 1:
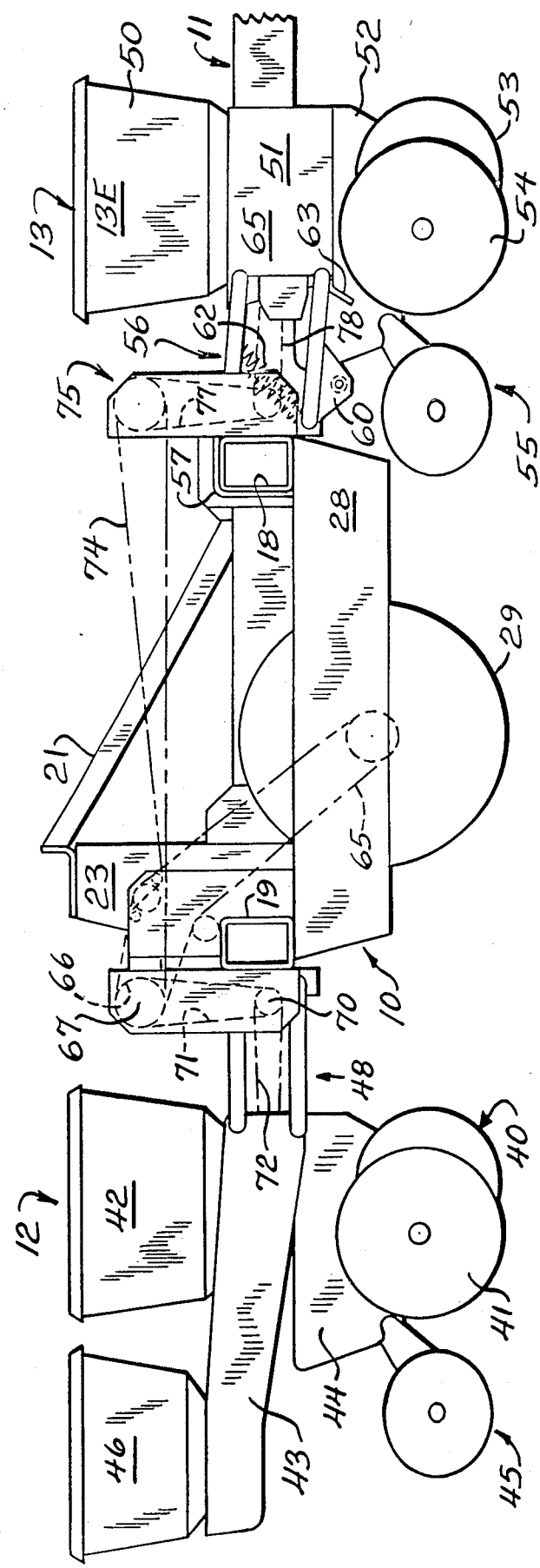
FIG. 1 is a right-side view of a planter incorporating the present invention, partly in fragmentary form.

Referring then to the drawing, the planter includes a frame generally designated 10 pulled by a tongue assembly generally designated 11 and seen in fragmentary form in the drawing. Conventional row units 12 are mounted to the rear of the planter frame 10. There are six such row units in the embodiment illustrated, and they are designated respectively 12A–12F. Driven row units 13 (five such row units individually designated 13A–13E being illustrated) are mounted in front of the planter frame 10 to be pushed in operation when the frame 10 is pulled by a tractor.

The tongue assembly 11 includes a draft member 14, the forward end of which is provided with a conventional hitch for attaching to a tractor drawbar (not shown). The rear portion of the tongue assembly is formed into a yoke, including a right side draft member 15 and a left side draft member 16, to permit a forward row unit 13C to be mounted on-center with the center line of the planter.

The rear ends of the draft members 15, 16 are bolted to the front surface of a forward mounting bar 18 of the frame.

The frame 10 includes the forward mounting bar 18 and a rear mounting bar 19 which are rigidly secured together by main cross braces 20, 21 welded between the forward mounting bar 18 and wheel towers 22, 23 respectively which are integrally mounted to the rear mounting bar 19. The frame 10 is further made rigid by additional frame elements 24, 25, each comprising a forward channel and a rear plate extending between the forward and rear mounting bars 18, 19. Additionally, elongated plates 27, 28 are mounted between the forward and rear mounting bars 18, 19 as seen to the right of FIG. 2; and a drive wheel 29 is supported by plates 27, 28 in a fixed elevational position. A similar drive wheel 30 is mounted to the left side of the frame 10.

Two sets of dual wheels 32, 33 respectively support the frame and permit it to be elevated for road transport or lowered for use, in which latter position, the drive wheels 29, 30 also engage the ground and are driven to provide power for the meters of the units, as will be described below.

The dual support wheels 32, 33 are mounted to a common transport axle 34 by means of wheel arms 36, 37 respectively. Hydraulic cylinders housed within the wheel towers 22, 23 and not seen extend between the wheel arms 36, 37 respectively and the associated wheel towers. When the hydraulic cylinders are extended, the frame is raised by lowering the dual wheels 32, 33 relative to the frame; and the transport axle 34 synchronizes the lowering of the wheels so that the frame raises evenly.

Turning now to FIG. 1, the rear row units 12 are conventional, and need not be described in great detail for a complete understanding of the invention. However, it will be observed they are of the type which includes a double disk opener 40 with dual gauge wheels, one being shown at 41, adjacent the double disk opener. The seed to be planted is stored in a seed hopper 42 supported on a frame comprising a hopper support panel 43 and a shank 44. A meter, not shown, receives seed at the bottom of the hopper 42, isolates individual seeds at a predetermined spacing, and delivers them through a seed tube into the furrow formed by the double disk opener 40. The gauge wheels 41 determine the depth of the furrow formed by the opener; and rear closing wheels 45 thereafter close the furrow. An insecticide/herbicide hopper 46 is mounted to the rear of the hopper support panel 43.

The frame of the individual row units is mounted to the rear mounting bar 19 by means of a conventional four-bar linkage generally designated 48, thereby permitting each individual row unit to follow the contour of the ground it traverses. The four-bar linkage 48 is mounted to the rear mounting bar 19 by means of conventional U-bolts which are shown for the forwardly mounted row units 13A and 13E, but otherwise omitted for clarity.

Figure 2:
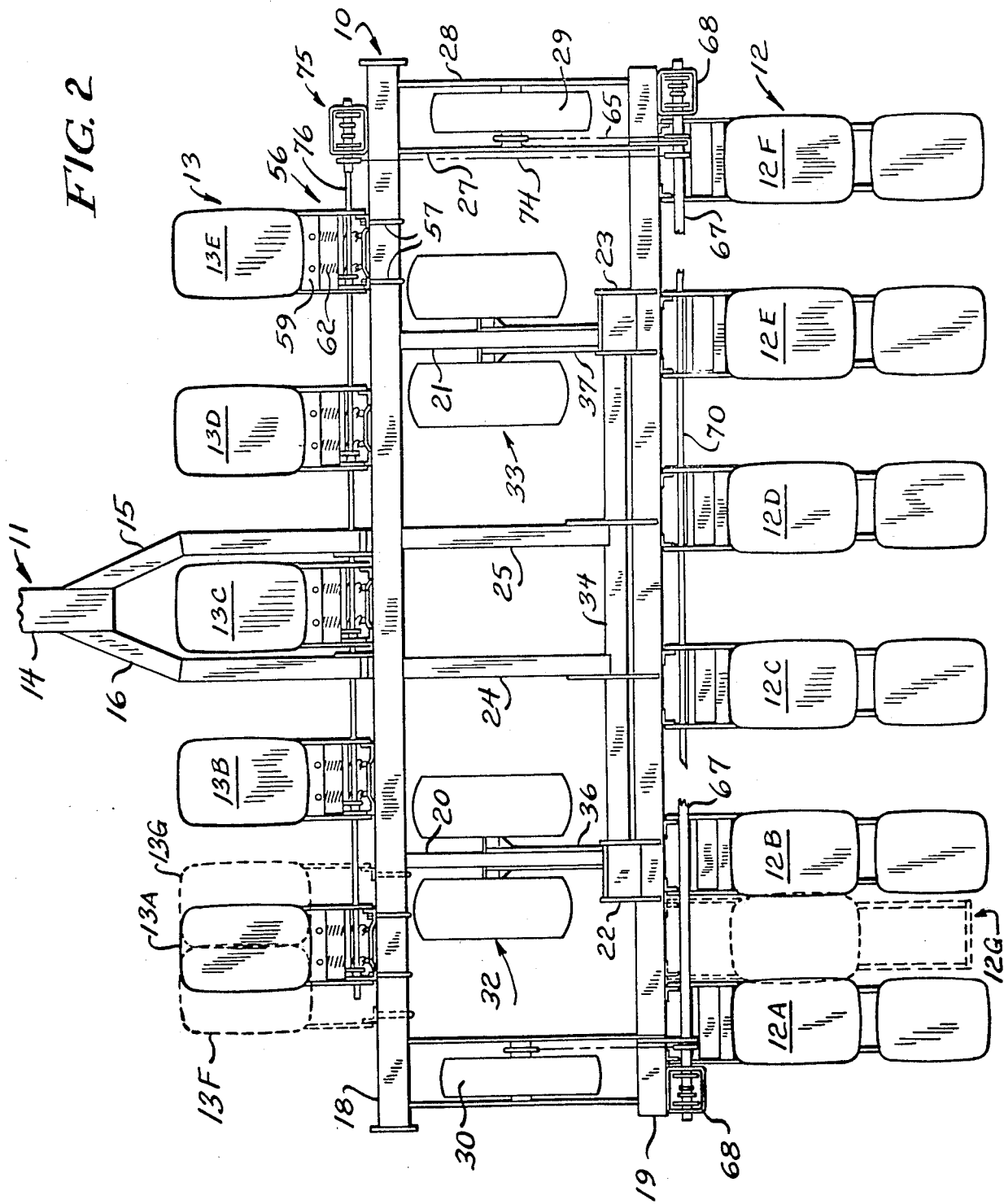
FIG. 2 is a plan view of the planter of FIG. 1 with alternate row unit spacings shown in dashed line.

Turning now to the forward row units 13, and particularly to row unit 13E as seen in FIGS. 1 and 2, it includes a seed hopper 50, a frame including a support panel 51 and shank 52 which are rigidly welded together, a double disk opener 53 and dual gauge wheels, one of which is shown at 54. Furrow closing wheels 55 are mounted to the rear of the shank 52. A four-bar linkage generally designated 56 connects the rear of the support panel 51 to the forward tool mounting bar 18 by means of U-bolts 57.

As best seen in FIG. 2, the four-bar linkage 56 includes upper and lower links both on the right and left side of the row unit, connecting the mounting bar 18 with the frame of the row unit. Torque tubes, one of which is seen at 59 in FIG. 2 and the other at 60 in FIG. 1 are connected respectively between the upper and lower links of the four-bar linkage 56 to prevent racking during operation and to strengthen the mounting of the row unit and to resist lateral deflection. Conventional down pressure springs 62 are connected between the brackets which attach the four-bar linkage to the mounting bar 18 and the upper torque tube assembly 59 (see FIG. 2) for providing additional downward force to the row units.

The lower torque tube assembly 60, which interconnects the lower links of the parallel linkages is located beneath those linkages in order to provide clearance for the rear portion of the shank 52, as best seen in FIG. 1.

The upper support frame of the forward row unit, namely, support panel 51, it will be observed, is much shorter than the corresponding hopper support frame 43 of the rear row unit 12. It is also formed of thicker sheet metal and includes higher side panels; and a front plate is added to interconnect the forward ends of the sides of that support frame for additional strength. In addition, transverse brace members, one of which is shown at 63 in FIG. 1, are welded between the shank 52 and the inner surface of the sides of the support panel 51 for adding additional resistance to twisting or bending during the pushing action which drives the forward row units. The pushing or driving force exerts more stress on the row units than is normally encountered when they are pulled.

A stop member 65 is welded to the support panel 51 and acts to limit both the downward and upward motion of the forward unit relative to the mounting bar 18 by engaging respectively the lower and upper links of the four-bar linkages in the limit positions.

The drive for the row units is the same on both sides of the planter. That is, it is the same for both drive wheels 29 and 30, so that only the drive associated with the wheel 29 need be described for a complete understanding of the invention. A chain 65 is driven by the wheel 29 and, as best seen in FIG. 1, entrained around idler sprockets and a driven sprocket 66 to drive an upper hexagonal drive shaft 67, seen in fragmentary form in FIG. 2. A transmission 68 is provided at each end of the drive shaft 67. The transmission 68 is conventional and includes a number of different gears for setting the drive of the seed meters relative to ground speed. Transmission 68, in turn, drives a lower hex drive shaft 70 by means of a chain 71. The individual rear row units 12 have their meters, in turn, driven by the shaft 70 via chains 72 and, if desired, clutches.

A chain 74 is also driven by the upper rear hex drive shaft 67 to drive a similar transmission 75 located on the forward portion of the frame and which, in turn, drives a lower drive shaft 76 via chain 77. The forward row units 13 have their meters driven by chains 78 which are coupled to the drive shaft 76.

Referring to FIG. 2, if it is assumed that the rear row units 12A–12F are mounted to the rear mounting bar 19 at a lateral spacing of 30 in. per row, they may be used to plant, for example, corn at that spacing which is a popular one. By lateral spacing, it is meant that the center-to-center spacing of the row units as measured along lines parallel to the direction of travel, are spaced at that distance. It is along these lines that the rows of crops are planted. If it is desired to plant beans at a 15 in. row spacing, so-called interplant units such as the one designated 12F and seen in dashed line could be placed between the two units 12A and 12B. This has been done in the past, however, the gauge wheels of adjacent row units at that spacing are so close together, realizing particularly that the depth gauge wheels are inclined upwardly and outwardly, that there is very little ability in that configuration to clear trash. As mentioned, the problem with clearing trash is particularly accute in minimum tillage or no-till conditions. The present invention thus provides that the forward row units 13A–13E be spaced at the same lateral spacing as the rear row units, but they are located along the forward mounting bar 18 such that they lie intermediate the spacing of the rear row units. Thus, the present invention, by providing row units which are driven by the planter frame rather than pulled by it, obviates the need for inter-plant units, all of which are pulled by the frame.

A planter thus set up can be used to plant corn at a 30 inch row spacing (by raising the forward row units 13 and tying them in the raised position) and to plant beans at a 15 inch spacing (by lowering the forward row units) without adjusting the spacing of units and the change over takes only a short time.

Even narrower spacings can be achieved for smaller seed crops, if desired, by reducing the lateral spacing of those shown. For example, by adjusting the on-center row spacing of rear and forward units to 20 inches (leaving adequate trash clearance and space between the units), a row spacing of 10 inches is achieved even though the width of the row units themselves is nominally 15 inches. In the limit, interplant row units can be used on both the forward mounting bar 18 and the rear mounting bar 19. That is, interplant row units such as that designated 12G would be inserted in addition to those shown in solid line 12A–12F. Further, row units would also be placed side-by-side on the forward mounting bar 18 such as those designated 13F and 13G. The center line of the row unit 13F is placed on a line that runs between rear row units 12A and 12G. Similarly, the center line of row unit 13G is placed on a line that runs between the two rows planted by rear row units 12G and 12B. Although it is possible to narrow present commercially available row units to achieve a row unit width of 12 inches or even less to provide clearance for adjacent hoppers, there is a limitation on the width that can be achieved with dual gauge wheels and still facilitate trash clearance, so that at the narrow spacings, it would be desirable to have a very fine seed bed preparation and avoid trash accumulation in that manner.

Another feature of the present invention is the high degree of visibility accorded the farmer during operation. In the past, with row units mounted behind the tool bar, not only does the tool bar frame obstruct his visibility of row unit operation, but typically there are other things mounted on the tool bar frame which obstruct his vision of the row unit in operation also, such as marker arms, or liquid fertilizer tanks, all of which are large and mounted directly above the frame to obscure the farmer's view of the row units. It is desirable for the farmer to see the row units in actual operation because he wants to detect immediately anything that would obstruct normal operation, such as a clod caught in the twin disk openers, trash interferring with the free rotation of the disk openers or the gauge wheels, or any number of other things that typically might occur in the field. Hence, he periodically inspects the planter in operation.

With the present invention it is thus possible to mount all of the row units on a single frame such that the row units extend in front of that frame. Insecticide and herbicide, for example, could be stored in a single hopper mounted in the frame and distributed to each of the row units as shown. This has the advantage of transferring weight to the tractor when the planter is raised, rather than reducing hitch weight as when the row units are mounted behind the support wheels and the planter is raised for transport.

Still another advantage accrues from mounting all of the row units in front of the frame, and it is that a rear-folding tool bar frame of greater simplicity can be designed. For example, the rear-folding planter frame described in my U.S. Pat. No. 4,117,893 requires that the row units be stored between the wings of the tool bar in the transport position. Because of the close dimensions involved, and because of the length of the wings, the row units may bounce against one another during road transport in the folded position. By having all of the row units mounted in front of the planter frame in the use position, if a horizontal rear folding tool bar construction is used, the tool bars can fold adjacent one another parallel to the line of travel in the transport position and be much closer to one another with the row units extending outwardly to the side of the tool bar. This has the further advantage that row units of different lengths can be used without modifying the structure of the tool bar.

Having thus disclosed in detail one embodiment of the invention, persons skilled in the art will be able to modify the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. An agricultural row crop planter comprising main frame means adapted to be pulled by a tractor and including forward and rear transverse mounting bars connected together to form said main frame means, first and second sets of row units, each set including a plurality of individual row units, each row unit including a row unit frame adapted to be mounted to said mounting bar means, furrow opener means carried by said row unit frame, gauge wheel means mounted to said row unit frame immediately adjacent said furrow opener means, and furrow closing means carried by said row unit frame behind said gauge wheel means; a first plurality of four-bar parallel linkage means, one associated with each row unit of said first set and connected to the rear of its associated row unit frame, for individually mounting said row units of said first set to said forward mounting bar such that said row units of said first set extend substantially entirely in front of said forward mounting bar; a second plurality of four-bar parallel linkage means, one associated with each row unit of said second set and connected to the front of its associated row unit frame, for individually mounting said row units of said second set to said rear mounting bar and extending behind said rear planter bar to be pulled by said frame, said row units of said second set being mounted at equal lateral spacing and in alternate relation with said row units of said first set; whereby said row units of said first set are pushed by said main frame means through said first linkage means and said row units of said second set are pulled by said main frame means through said second linkage means when said main frame means is pulled by said tractor.

2. The apparatus of claim 1 wherein each of said of said row units of said first set further comprises means for strengthening said row unit frame to resist lateral deflection when driven by said main frame means; and each row unit of said first set includes only a seed hopper mounted to said row unit frame and is characterized in being shorter in fore-to-aft length than the row units of said second set.

3. The apparatus of claim 1 further comprising draft means for mounting said main frame means to a tractor, said draft means defining a yoke including first and second laterally spaced draft members; and one of said row units of said first set being mounted to said main frame between said laterally spaced draft members and located on the center line of the tractor extending in the direction of travel.

4. The apparatus of claim 3 wherein said main frame means further includes support wheels mounted thereto and located between said forward and rear mounting bars.

* * * * *